United States Patent
Matsuki

(10) Patent No.: US 7,986,074 B2
(45) Date of Patent: Jul. 26, 2011

(54) INERTIAL DRIVE ACTUATOR

(75) Inventor: Kaoru Matsuki, Kawasaki (JP)

(73) Assignee: Olympus Corporation, Tokyo (JP)

( * ) Notice: Subject to any disclaimer, the term of this patent is extended or adjusted under 35 U.S.C. 154(b) by 273 days.

(21) Appl. No.: 12/437,729

(22) Filed: May 8, 2009

(65) Prior Publication Data

US 2009/0277300 A1    Nov. 12, 2009

(30) Foreign Application Priority Data

May 8, 2008  (JP) ................................ 2008-122200

(51) Int. Cl.
*H01L 41/09* (2006.01)
(52) U.S. Cl. .......... 310/321; 310/309; 310/328; 74/99 R
(58) Field of Classification Search .................. 310/321, 310/309, 328; 74/99 R
See application file for complete search history.

(56) References Cited

U.S. PATENT DOCUMENTS

| | | | | |
|---|---|---|---|---|
| 6,739,550 | B2* | 5/2004 | Koizumi et al. | 244/99.4 |
| 6,841,899 | B2* | 1/2005 | Kaneko | 310/12.31 |
| 2005/0242688 | A1* | 11/2005 | Yuasa et al. | 310/328 |
| 2007/0241640 | A1* | 10/2007 | Matsuki | 310/323.01 |
| 2008/0111446 | A1* | 5/2008 | Matsuki | 310/310 |
| 2008/0179992 | A1* | 7/2008 | Noda et al. | 310/317 |
| 2008/0265136 | A1* | 10/2008 | Tanaka et al. | 250/206.1 |
| 2009/0015949 | A1* | 1/2009 | Matsuki | 359/824 |

FOREIGN PATENT DOCUMENTS

JP    2003-185406    7/2003

* cited by examiner

*Primary Examiner* — Thomas M Dougherty
*Assistant Examiner* — Bryan P Gordon
(74) *Attorney, Agent, or Firm* — Scully, Scott, Murphy & Presser, P.C.

(57) ABSTRACT

An inertial drive actuator includes a fixed member, a displacement generating mechanism which is connected to the fixed member, and which generates a minute displacement in a first direction and a second direction, a vibration substrate which reciprocates by the minute displacement generated by the displacement generating mechanism, a mobile object which is disposed on the vibration substrate, and which is movable by inertia, a driving mechanism which is connected to the mobile object, and which controls a frictional force between the mobile object and the vibration substrate by making an electromagnetic force to act in the mobile object by applying a current, a detecting electrode having a position detection function, which is disposed on a flat surface of the vibration substrate, to be facing the mobile object via an insulating body layer, and which is formed such that, an area face-to-face thereof with the mobile object either increases continuously or decreases continuously with the movement of the mobile object, and a position detecting mechanism which detects a position of the mobile object by detecting an electrostatic capacitance generated between the mobile object and the detecting electrode.

6 Claims, 14 Drawing Sheets

60

60

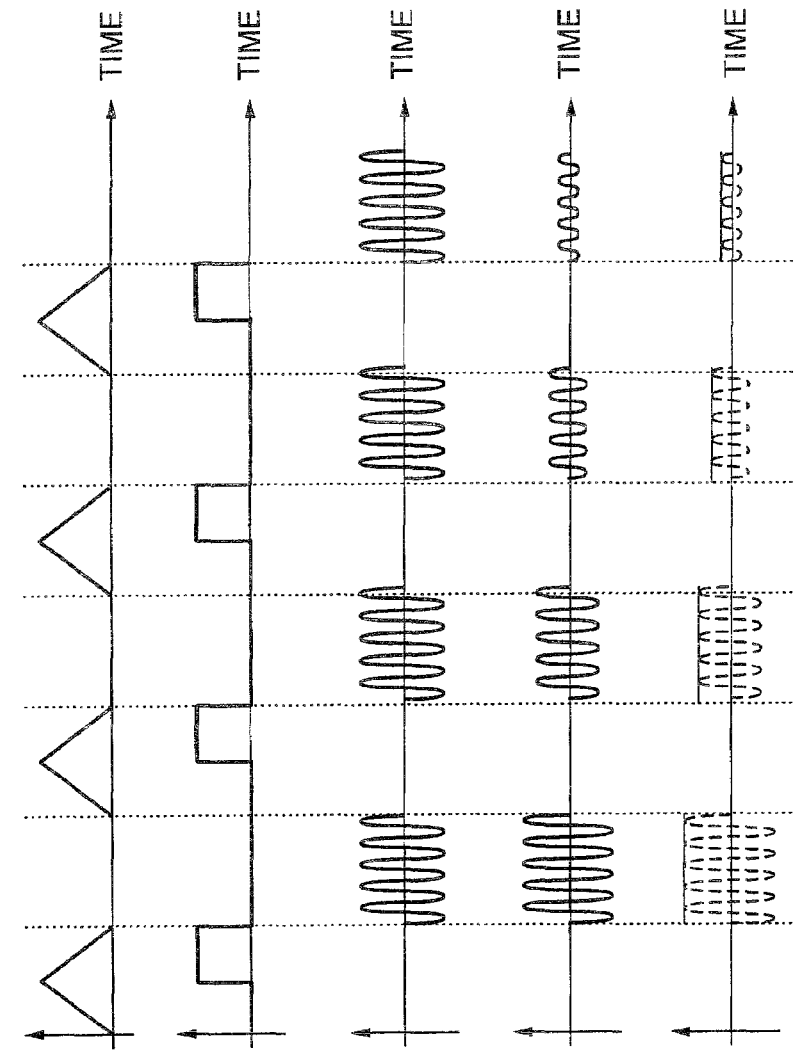

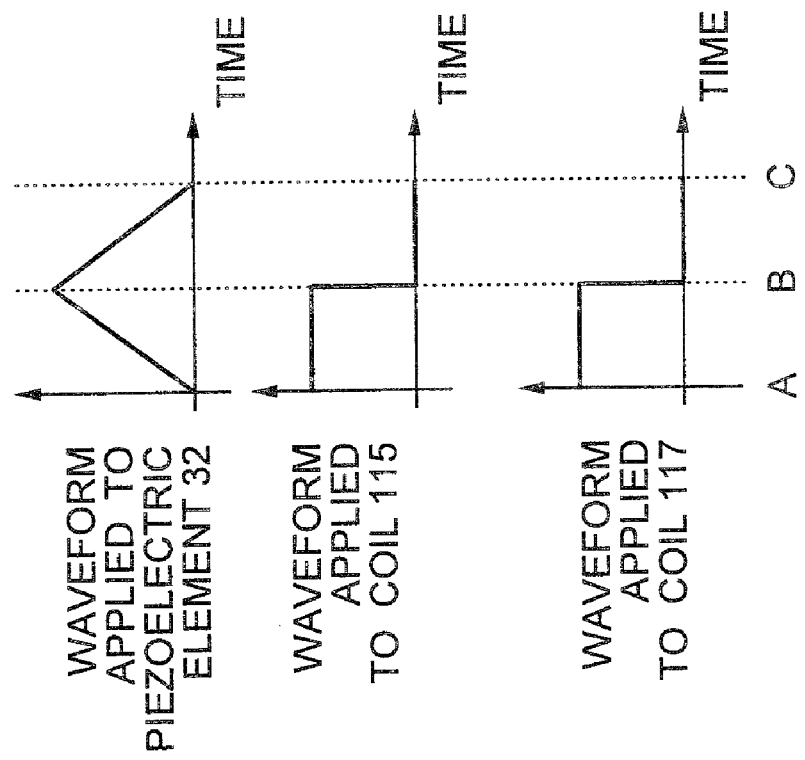
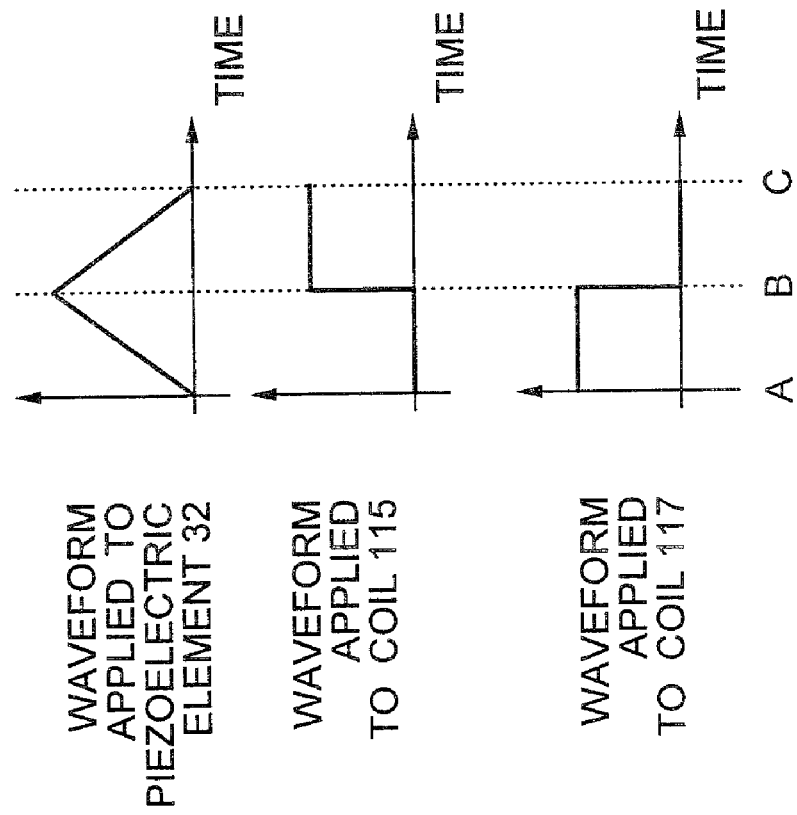

INERTIAL DRIVE ACTUATOR

CROSS-REFERENCE TO RELATED APPLICATION

The present application is based upon and claims the benefit of priority from the prior Japanese Patent Application No. 2008-122200 filed on May 8, 2008; the entire contents of which are incorporated herein by reference.

BACKGROUND OF THE INVENTION

1. Field of the Invention

The present invention relates to an inertial drive actuator.

2. Description of the Related Art

When a drive pulse of a waveform formed of a gently rising part, and a rapidly falling part in continuity with the gently rising portion is applied to an electromechanical transducer such as a piezoelectric element, in the gently rising part of the drive pulse, the piezoelectric element is displaced by being elongated gently in a direction of thickness, and in the rapidly falling part, the piezoelectric element is displaced by being contracted rapidly. Given this, an actuator in which, using this characteristic, by applying a drive pulse of a waveform as mentioned above to the piezoelectric element, charging and discharging are repeated at different speeds, and vibrations are generated in a direction of thickness in the piezoelectric element, at different speeds, and a drive shaft fixed to the piezoelectric element is let to make reciprocating movement at different speeds, and a mobile object which is attached to the driving member is moved in a predetermined direction has hitherto been known (for example, refer to Japanese Patent Application Laid-open Publication No. 2003-185406)

As a conventional example of such actuator, an actuator 200 shown in FIG. 13A and FIG. 13B is available. FIG. 13A is a perspective view showing a structure of the conventional actuator 200, and FIG. 13B is a cross-sectional view taken along a line XIIIB-XIIIB in FIG. 13A. The actuator 200 acquires a frictional force by a mobile object 204 being pressed by a drive shaft 203. A method in which, a plate spring is used has been widely used as a method for acquiring the frictional force. Here, the frictional force is imparted by inserting a pinching member 205, and pressing the pinching member 205 from above by an elastic member 206. The pinching member 205 is fitted tightly to the mobile object 204 in a direction of movement of the drive shaft 203. With the abovementioned structure, a pressing force generated by the elastic member 206 is transmitted to the drive shaft 203 via the pinching member 205. Therefore, even when the drive shaft 203 changes at a different speed in a positive direction and a negative direction in an axial direction, the elastic member 206 does not undergo an elastic deformation, and it is possible to drive the mobile object 204 stably at a high speed.

Moreover, an actuator shown in FIG. 14 can be cited as a conventional actuator. FIG. 14 is a schematic diagram showing a structure of a conventional actuator 300. The actuator 300 shown in FIG. 14 is capable of detecting a position, and includes a piezoelectric element 301, a drive shaft 302, a mobile object 303 attached to the drive shaft 302, a frame 304 of the actuator, and a detecting member 305. One end of the piezoelectric element 301 is fixed by adhering to the frame 304, and the other end of the piezoelectric element 301 is fixed by adhering to the drive shaft 302. The mobile object 303 is slidably movable on the drive shaft 302.

The detecting member 305 forms a fixed electrode for detecting a position of the mobile object 303, based on an electrostatic capacitance, which is arranged not to be in contact, parallel along a direction of movement of the mobile object 303, and is fixed to the frame 304. Moreover, the drive shaft 302, the mobile object 303, and the detecting member 305 are formed of an electroconductive material.

On a surface of the detecting member 305 facing the mobile object 303, recesses and projections are formed at a fixed interval along the direction of movement of the mobile object 303, thereby forming an electrode 305a. The electrode 305a and the mobile object 303 are positioned face-to-face, to be isolated at a distance D, and form a condenser of electrostatic capacitance C. Since an electrostatic capacitance between the mobile object 303 and the projection on the electrode 305a is higher than an electrostatic capacitance between the mobile object 303 and the recess on the electrode 305a, by moving of the mobile object 303, the electrostatic capacitance between the mobile object 303 and the electrode 305a changes periodically. The actuator 300 detects a position of the mobile object 303 by capturing a cycle of such change of electrostatic capacitance.

However, when an actuator section 310 including the piezoelectric element 301, the drive shaft 302, and the mobile object 303, and a position sensor section 320 including the detecting member 305 are installed separately, since each of the actuator section 310 and the position sensor section 320 has a mobile shaft and a detection shaft, the two shafts may be misaligned according to a method of installing. In a position sensor which detects the electrostatic capacitance of the actuator 300 in the conventional example, a value of the electrostatic capacitance changes according to a gap between the mobile object 303 and the electrode 305a. Therefore, when the mobile shaft and the detection shaft are misaligned in a direction of gap, the gap between the mobile object 303 and the electrode 305a changes according to the position of the mobile object 303. Consequently, the electrostatic capacitance changes according to the position of the mobile object 303, thereby causing a decline in accuracy of detection, and it becomes difficult to detect the position accurately. Moreover, it is extremely difficult to dispose the mobile object 303 and the electrode 305a to be mutually parallel in order to maintain the gap to be same over the entire range of movement of the mobile object 303, and to improve the position accuracy, an assembling accuracy is to be improved.

SUMMARY OF THE INVENTION

The present invention is made in view of the abovementioned circumstances, and an object of the present invention is to provide an inertial drive actuator which is capable of carrying out an accurate position detection over an entire range of movement of a mobile object.

To solve the abovementioned issues, and to achieve the object, according to the present invention, there is provided an inertial drive actuator including a fixed member, a displacement generating mechanism which is connected to the fixed member, and which generates a displacement in a first direction, and a second direction which is opposite to the first direction, a vibration substrate which reciprocates by the displacement generated by the displacement generating mechanism, a mobile object which is disposed on the vibration substrate, and which is movable by inertia, a driving mechanism which is connected to the mobile object, and which controls a frictional force between the mobile object and the vibration substrate by making an electromagnetic force to act in the mobile object by applying a current, a detecting electrode having a position detection function, which is disposed on a flat surface of the vibration substrate, to be facing the mobile object via an insulation body layer, and which is formed such that, an area face-to-face thereof with the mobile object either increases continuously or decreases continuously with the movement of the mobile object, and a position detecting mechanism which detects a position of the mobile object by detecting an electrostatic capacitance generated between the mobile object and the detecting electrode.

In the inertial drive actuator according to the present invention, it is preferable that the detecting electrode is divided into two electrodes with respect to a direction of movement of the mobile object, and the mobile object is disposed to be spread over the detecting electrode which is divided into two electrodes.

In the inertial drive actuator according to the present invention, the mobile object may include a coil which generates an electromagnetic force by a current applied by the driving mechanism, and a wire of one of the two electrodes formed by dividing the detecting electrode may be connected to the driving mechanism by a wire same as a signal wire of the coil, and the other electrode may be connected to a GND (ground) by a wire same as a GND wire of the coil, and a timing at which the position detecting mechanism detects the electrostatic capacitance generated between the mobile object and the detecting electrode may be after the mobile object has been moved by the driving mechanism.

In the inertial drive actuator according to the present invention, there may exist a plurality of mobile objects which include a coil, in a direction perpendicular to the direction of movement, and the driving mechanism may change a magnetic adsorption force between the vibration substrate and the mobile object independently by applying a current independently to the plurality of coils.

In the inertial drive actuator according to the present invention, it is preferable that the detecting electrode is divided into three electrodes with respect to the direction of movement of the mobile object, and there exists a plurality of mobile objects which include a coil, in a direction of movement, and a driving mechanism changes a magnetic adsorption force between the vibration substrate and the mobile object independently by applying a current independently to the plurality of coils.

In the inertial drive actuator according to the present invention, a wire of two electrodes which are not adjacent, out of the three electrodes formed by dividing the detecting electrode in the direction of movement may be a common wire.

BRIEF DESCRIPTION OF THE DRAWINGS

FIG. 3B is replaced by a circuit;

FIG. 8A, FIG. 8B, FIG. 8C, FIG. 8D, and FIG. 8E (hereinafter, 'FIG. 8A to FIG. 8E') are graphs in which, driving detection waveforms in the inertial drive actuator according to the second embodiment are shown;

FIG. 12A and FIG. 12B are graphs showing a driving waveform of the inertial drive actuator according to the fourth embodiment.

DETAILED DESCRIPTION OF THE PREFERRED EMBODIMENTS

Exemplary embodiments of an inertial drive actuator according to the present invention will be described below in detail by referring to the accompanying diagrams. However, the present invention is not restricted to the embodiments described below.

First Embodiment

An inertial drive actuator according to a first embodiment of the present invention will be described below while referring to the accompanying diagrams.

Figure 1:
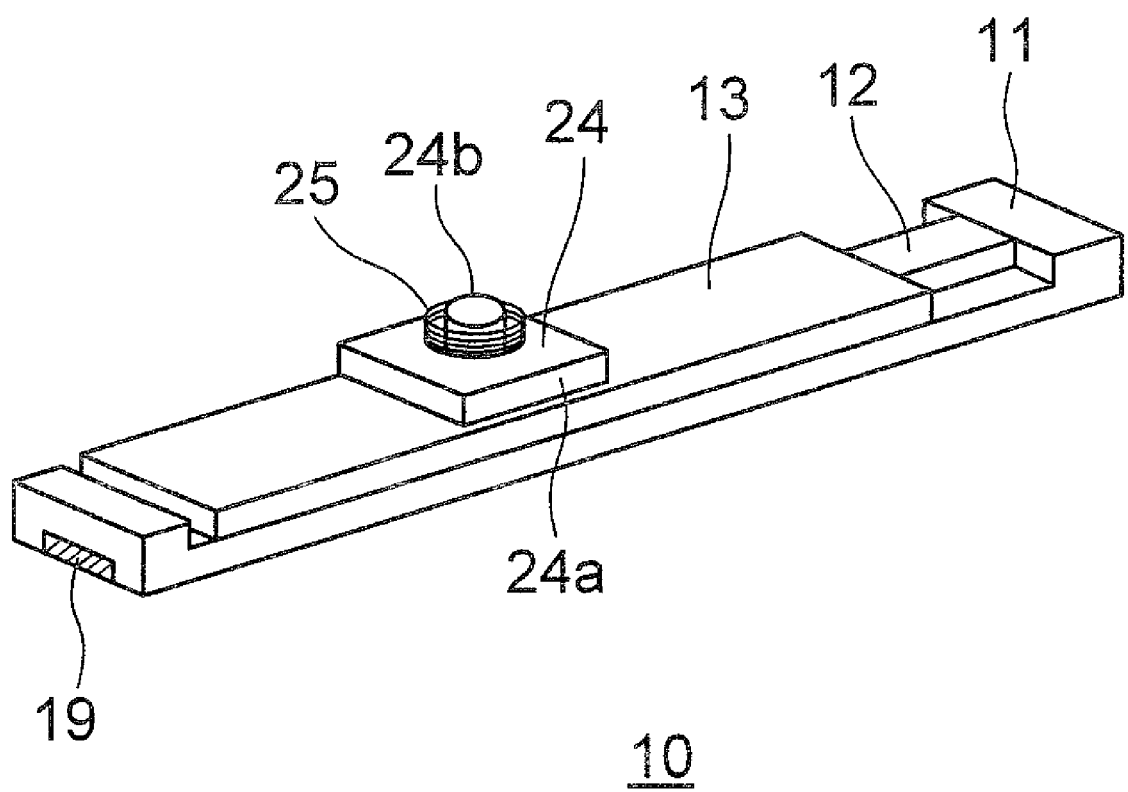
FIG. 1 is a perspective view showing a structure of an inertial drive actuator according to a first embodiment of the present invention.

First of all, a driving principle of an inertial drive actuator 10 according to the first embodiment will be described below while referring to FIG. 1, FIG. 2A, and FIG. 2B. FIG. 1 is a perspective view of the inertial drive actuator according to the first embodiment of the present invention. In the inertial drive actuator 10, a vibration substrate 13 is mounted on a fixed member 11. One end of a piezoelectric element 12 is fixed to the fixed member 11, and the other end of the piezoelectric element is fixed to one end of the vibration substrate 13. A mobile object 24 which is movable in a direction in which the piezoelectric element 12 vibrates is disposed on the vibration substrate 13. An adsorption section 24a is formed on a lower surface of the mobile object 24, and a protrusion 24b is provided on an upper surface of the mobile object 24, or in other words, on a surface on an opposite side of a surface facing the vibration substrate 13. A coil 25 is disposed around an outer peripheral surface of the protrusion 24b. The fixed member 11 and/or the vibration substrate 13 are made of a magnetic body (such as iron or a magnetic steel), and the adsorption section 24a also is a magnetic body. A bottom surface of the adsorption section 24a is in contact with the vibration substrate 13, and a magnetic field is generated when an electric current is applied to (is passed through) the coil 25. The magnetic field generated passes through the mobile object 24 which is a magnetic body, and accordingly, an electric field is generated in the adsorption section 24a as well. Since a magnetic adsorption force is generated in the vibration substrate 13 and/or the fixed member 11 which also are/is the magnetic body, due to the magnetic field generated in the adsorption section 24a, the mobile object 24 is adsorbed by the vibration substrate 13 or the fixed member 11. Moreover, a permanent magnet 19 is disposed on a bottom surface of the fixed member 11, and attracts the fixed member 11 and/or the vibration substrate 13. It is not shown in the diagram, but a spring is disposed between an end surface of the vibration substrate 13, opposite to (on an opposite side of) an end surface to which the piezoelectric element 12 is fixed, and the fixed member 11.

Figure 2A:
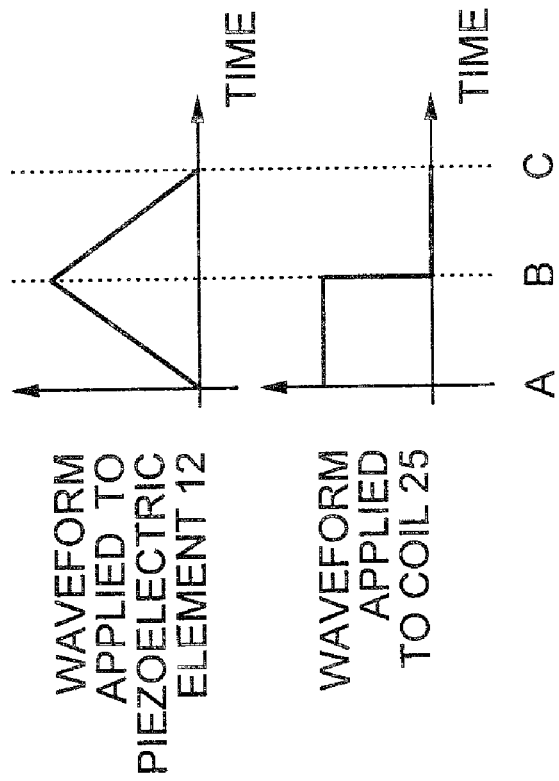
FIG. 2A is a graph showing a driving waveform which moves a mobile object to right.
Figure 2B:
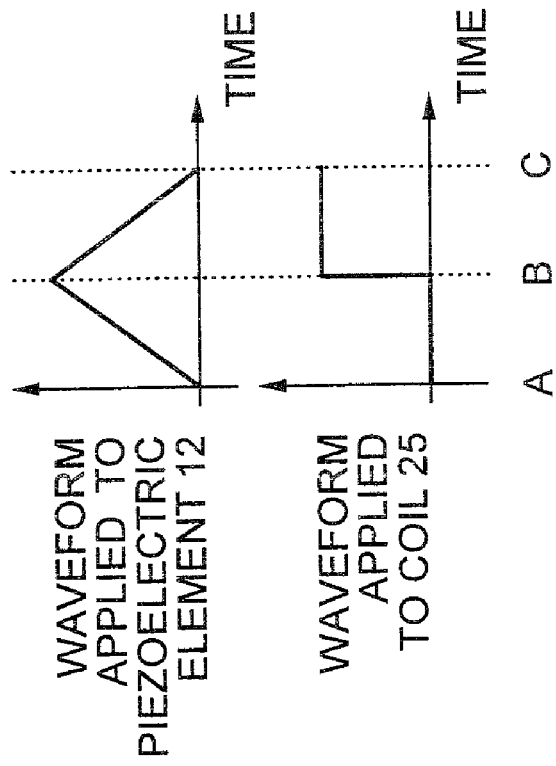
FIG. 2B is a graph showing a driving waveform which moves the mobile object to left.

FIG. 2A and FIG. 2B are graphs showing driving waveforms of the inertial drive actuator 10. The upper graph shows a waveform applied to the piezoelectric element 12, and the lower graph shows a waveform applied to the coil 25. Moreover, FIG. 2A is a waveform which moves the mobile object 24 to right (a direction approaching the piezoelectric element 12), and FIG. 2B is a waveform which moves the mobile object 24 to left (a direction receding from the piezoelectric element 12). The driving principle will be described by citing FIG. 1 and FIG. 2B as examples. As it is shown in the upper graph in FIG. 2B, in a steeply rising part of the waveform applied to the piezoelectric element 12, the piezoelectric element 12 undergoes rapidly a minute displacement (elongation) to left, and the vibration substrate 13 also moves rapidly to left. At this time, as shown in the lower graph in FIG. 2B, since the electric current is applied to the coil 25, the magnetic adsorption force is generated between the vibration substrate 13 and the adsorption section 24a of the mobile object 24, a friction occurs between the vibration substrate 13 and the adsorption section 24a. Consequently, the mobile object 24 also moves to left together with the movement of the vibration substrate 13.

Whereas, at a falling part of the waveform applied to the piezoelectric element 12, the electric current is not passed through the coil 25. Therefore, the adsorption force, or in other words, the frictional force does not act between the mobile object 24 and the vibration substrate 13. Consequently, when the piezoelectric element 12 undergoes a minute displacement to right and the vibration substrate 13 moves to right due to the falling of the waveform applied to the piezoelectric element 12, since there is no frictional force between the mobile object 24 and the vibration substrate 13, there occurs a slippage and at the same time, the mobile object 24 is about to stop due to an inertia of the mobile object 24.

By applying the signal repeatedly to the piezoelectric element 12 and the coil 25 as mentioned above, the mobile object 24 moves to left with respect to the vibration substrate 13.

On the other hand, in a case of the mobile object 24 moving to right, as shown in FIG. 2A, when the waveform applied to the piezoelectric element 12 is made to fall and the piezoelectric element 12 is made to contract rapidly, a magnetic field is to be generated by passing the electric current through the coil 25. The basic driving principle of the inertial drive actuator 10 according to the first embodiment is as described above.

The friction between the mobile object 24 and the fixed member 11 or the vibration substrate 13 being imparted by the magnetic adsorption force by allowing to synchronize with the piezoelectric vibrations of the piezoelectric element 12, the mobile object 24 moves only when the friction has increased. Accordingly, a driving efficiency is improved, and since the frictional force is controlled by the magnetic adsorption force which is generated by the electric current applied to the coil 25, the frictional force does not change due to wearing out, and a stable operation becomes possible. Moreover, it is possible to carry out an inertial drive without changing a displacement speed of the piezoelectric element 12 on a way and away back. Consequently, a complicated waveform is not created at the time of operating the piezoelectric actuator 12.

Figure 3A:
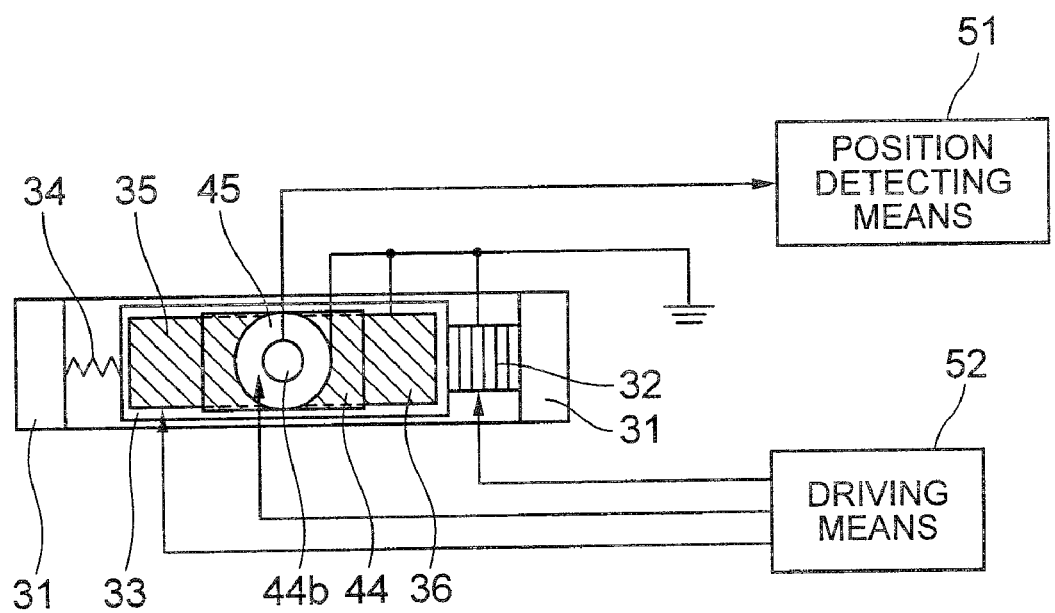
FIG. 3A is a schematic diagram showing the structure of the inertial drive actuator according to the first embodiment.
Figure 3B:
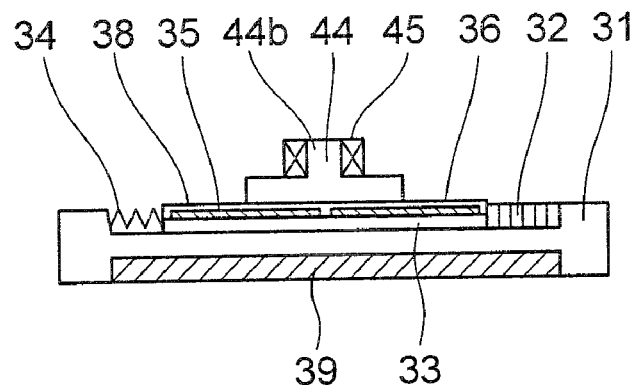
FIG. 3B is a side view showing the structure of the inertial drive actuator.

Next, an inertial drive actuator 30 having a position detection function, which can be driven similarly as the inertial drive actuator 10 will be described below by referring to FIG. 3A, FIG. 3B, FIG. 4, and FIG. 5A to FIG. 5E. FIG. 3A is a schematic diagram showing a structure of the inertial drive actuator 30 according to the first embodiment, and shows components other than a position detecting means 51 and a driving means 52 in a plan view. FIG. 3B is a side view showing the structure of the inertial drive actuator 30. In FIG. 3B, the position detecting means (or position detecting mechanism) 51 and the driving means (or driving mechanism) 52 are omitted.

FIG. 3A and FIG. 3B are diagrams in which, a structure for detecting a position of the inertial drive actuator 10 shown in FIG. 1 is shown. A vibration substrate 33 in the form of a rectangular plate is mounted on a fixed member 31, to be movable in a longitudinal direction. One end of a piezoelectric element (displacement generating means) is fixed to one end in the longitudinal direction of the vibration substrate 33, and the other end of the piezoelectric element 32 is fixed to the fixed member 31. Moreover, one end of a spring 34 is fixed to the other end in the longitudinal direction of the vibration substrate 33, and the other end of the spring 34 is fixed to the fixed member 31. The piezoelectric element 32, by applying or releasing a voltage, generates a minute displacement in a direction of elongation (a first direction) and in a direction of contraction (a second direction). A mobile object 44 which is movable in a direction in which the piezoelectric element vibrates is disposed on the vibration substrate 33. An adsorption section (not shown in the diagram) similar to the adsorption section 24a is formed on a lower surface of the mobile object 44, and a protrusion 44b is provided on an upper surface of the mobile object 44. A coil 45 is disposed around an outer peripheral surface of the protrusion 44b.

Electrodes 35 and 36 (detecting electrodes) for detecting a position of the mobile object 44 are formed on the vibration substrate 33. The electrodes 35 and 36 are wired to the driving means 52 and the GND respectively. Moreover, a portion of the protrusion 44b of the mobile object 24 around which the coil is not disposed is also wired, and this wire is connected to the position detecting means 51. The electrodes 35 and 36 are divided into two in a direction of movement (longitudinal direction of the vibration substrate 33) on the vibration substrate 33. The mobile object 44 moves in the longitudinal direction of the vibration substrate 33, and is spread over the two electrodes 35 and 36 all the time. Accordingly, a condenser is formed in a portion facing the mobile object 44 and each of the electrodes 35 and 36. Consequently, by detecting an electrostatic capacitance proportional to an area facing the mobile object 44 and the electrodes 35 and 36, it is possible to detect a position of the mobile object 44. In the inertial drive actuator 30 according to the first embodiment, upon dividing the electrode into two, by taking a difference between an electrostatic capacitance between the electrode 35 and the mobile object 44, and an electrostatic capacitance between the electrode 36 and the mobile object 44, and by extracting only an amount of difference in the capacitance, a resolving power is achieved. When such an arrangement is made, since the electrodes 35 and 36 formed on the vibration substrate 33 have the position detection function, a moving shaft as an actuator when the mobile object moves, and a detecting shaft for detecting the position of the mobile object 44 coincide mutually. Consequently, since it is possible to make coincide the moving shaft and the detecting shaft easily, an accurate assembling as required in a conventional actuator is not necessary.

Furthermore, it is possible to form an insulating film 38 and the electrodes 35 and 36 on the vibration substrate 33 on a same flat surface as the vibration substrate 33 by a semiconductor process. Accordingly, it is possible to maintain a gap to be detected (a gap between the mobile object 44 and the electrodes 35 and 36) to be extremely narrow such as less than few μm or sub μm, and constant over an entire range of movement of the mobile object 44. Therefore, as a substantial capacitance is achieved (obtained) over the entire range of movement, it is possible to improve a resolving power of detection as well.

Figure 4:
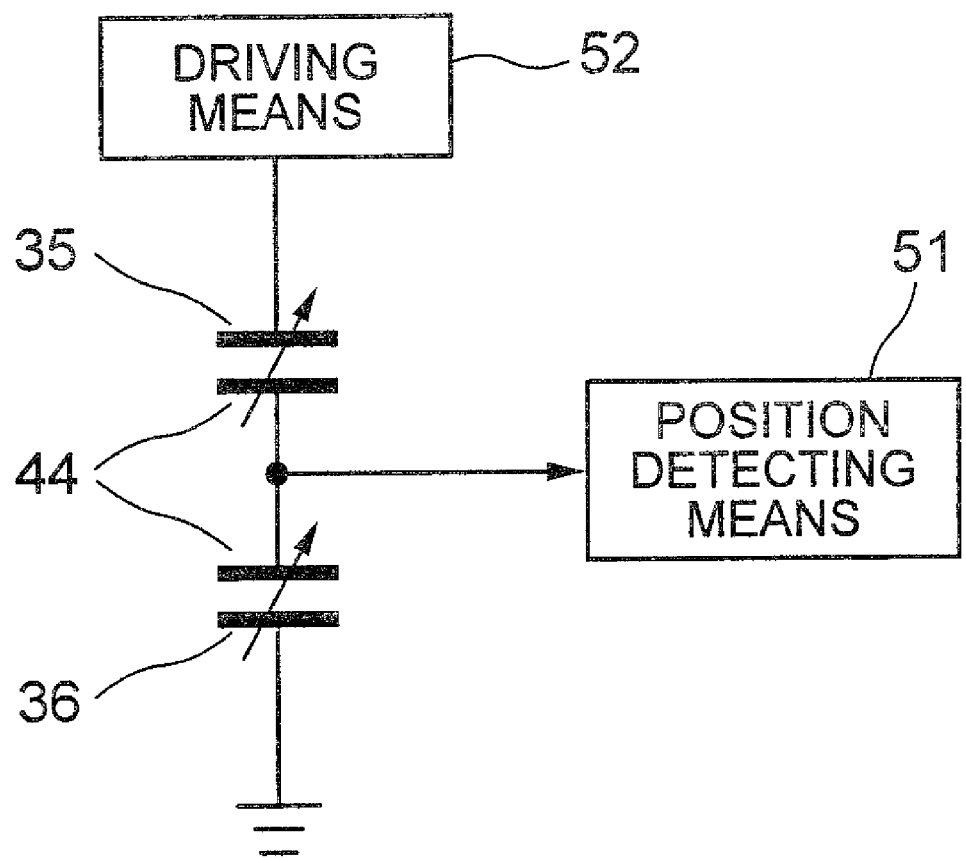
FIG. 4 is a diagram in which an electrostatic capacitance detecting portion in FIG. 3A

FIG. 4 is a diagram in which an electrostatic capacitance detecting portion in FIG. 3A and FIG. 3B is replaced by a circuit. As shown in FIG. 4, a variable condenser is formed by the electrodes 35 and 36 facing the mobile object 44. A voltage waveform for detecting the electrical capacitance is applied to the electrode 35 by a wire from the driving means 52. A site other than the coil 45 is wired to the mobile object 44, and this wire is connected to the position detecting means 51. Mainly a sinusoidal wave is applied from the driving means 52, and an amplitude of the sine wave applied changes according to the electrostatic capacitance between the electrodes 35 and 36 respectively facing the mobile object 44. This, when these two condensers are likened to resistances, is a type of a resistance dividing circuit, and an amplitude subjected to voltage division is output as a sine wave from the wire from the mobile object 44.

Figure 5A:
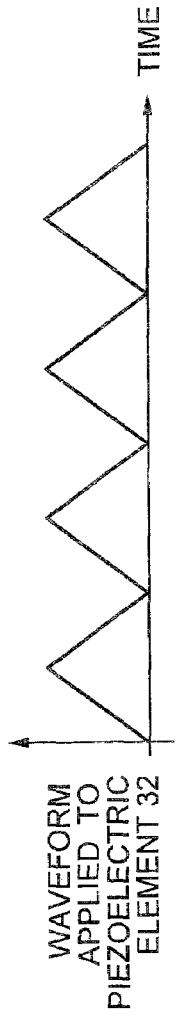
FIG. 5A, FIG. 5B, FIG. 5C, FIG. 5D, and FIG. 5E (hereinafter, 'FIG. 5A to FIG. 5E') are graphs in which, driving detection waveforms in the inertial drive actuator according to the first embodiment are shown.
Figure 5B:
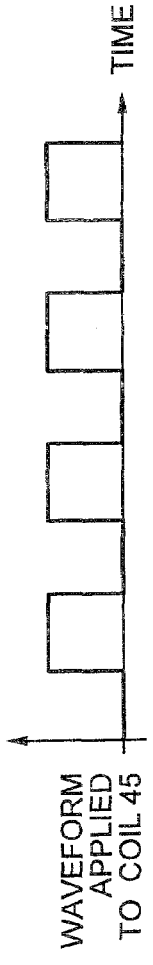
Figure 5C:
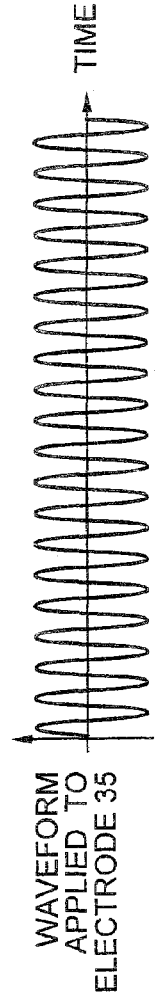
Figure 5D:
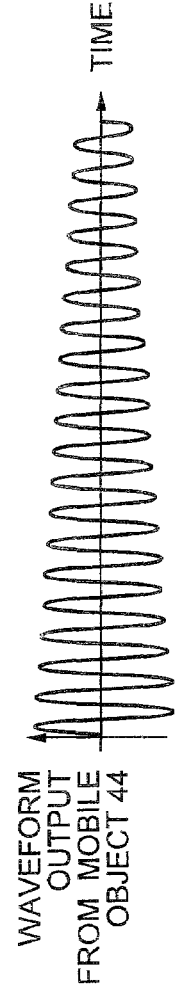
Figure 5E:
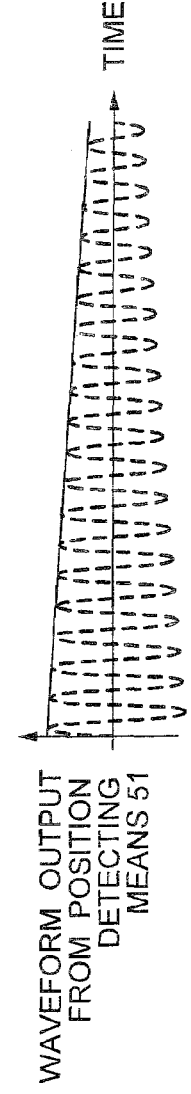

FIG. 5A to FIG. 5E are graphs in which, driving detection waveforms in the inertial drive actuator 30 according to the first embodiment are shown. FIG. 5A to FIG. 5E show waveforms when the mobile object 44 moves to right. FIG. 5A shows a waveform applied to the piezoelectric element 32, FIG. 5B shows a waveform applied to the coil 45, FIG. 5C shows a waveform applied to the electrode 35, FIG. 5D shows a waveform output from the mobile object 44, and FIG. 5E shows a waveform output from the position detecting means 51. Regarding FIG. 5A and FIG. 5B, the waveforms being similar to the waveform applied to the piezoelectric element 12 and the waveform applied to the coil 25 in FIG. 2A, the description in detail is omitted. Moreover, in a case in which the mobile object 44 moves to left, a waveform similar to the waveform shown in FIG. 2B is to be applied.

When a sinusoidal wave shown in FIG. 5C is applied from the driving means 52 to the electrode 35, apart from the waveform applied to the piezoelectric element 32 and the coil 45, a sinusoidal wave subjected to a voltage division due to a circuit effect shown in FIG. 4 is output. In an example in which the mobile object moves to right as shown in FIG. 5, when the mobile object 44 moves to right (right direction in FIG. 3A and FIG. 3B), an area face-to-face of the mobile object 44 and the electrode 35 becomes smaller gradually, whereas an area face-to-face of the mobile object 44 and the electrode 36 becomes larger gradually. Therefore, as shown in FIG. 5D and FIG. 5E, as a result, amplitude of an output from the mobile object becomes small with the mobile object 44 moving to right. The position detecting means 51 extracts only an amplitude component, and detects it as a position of the mobile object 44. Moreover, a voltage applying path being structured as mentioned above, it is possible to apply simultaneously, a voltage for adsorbing the mobile object 24 in the fixed member 31 or the vibration substrate 33, and a voltage for the position detection of the mobile object 24. Therefore, it is possible to carry out an the position detection efficiently, and to reduce the wires as compared to (the wires in the conventional actuator.

Figure 6:
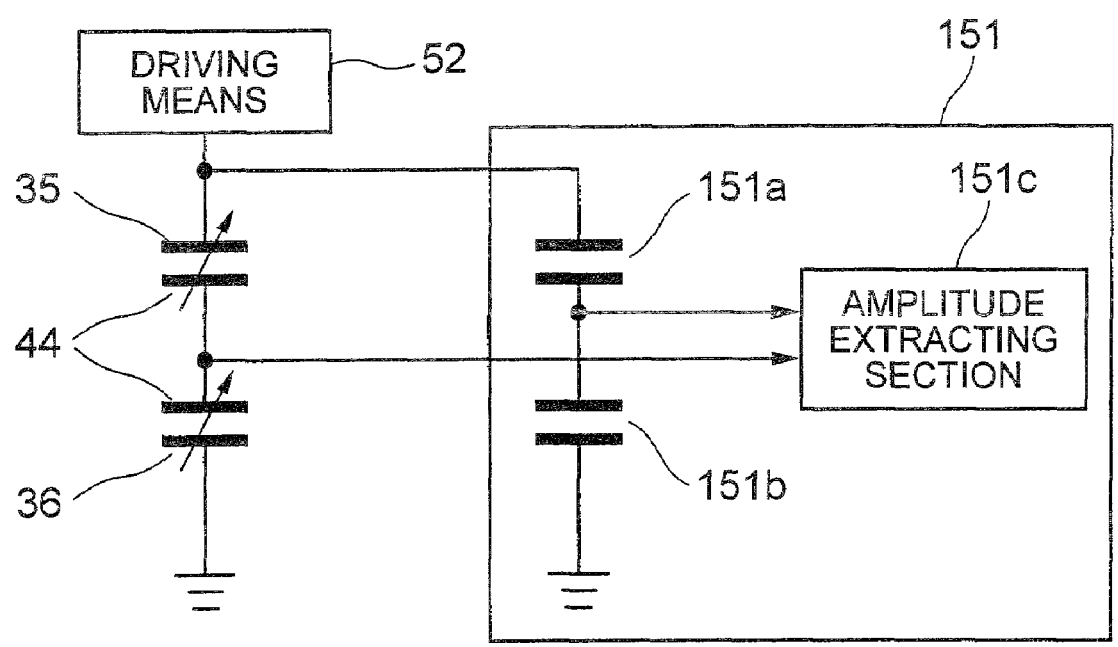
FIG. 6 is a circuit diagram showing a structure of a position detecting means of an inertial drive actuator according to a modified embodiment.

A modified embodiment for improving the resolving power of the position detection will be described below by referring to FIG. 6. FIG. 6 is a circuit diagram showing a structure of a position detecting means 151 of an inertial drive actuator according to the modified embodiment. The position detecting means 151 shown in FIG. 6 connects two condensers 151a, 151b having a capacitance equivalent to a capacitance when the mobile object 44 has come to a center, or in other words, when an face-to-face area of the mobile object 44 and the electrode 35 and the electrode 36 between the driving means 52 and a variable condenser which corresponds to the electrode 35, and inputs to an amplitude extracting section 151c together with an output from between the two condensers corresponding to the electrode 35 and the electrode 36 (output from the mobile object 44). At the time of extracting amplitude by the amplitude extracting section 151c, the amplitude is extracted from a difference in the output from the mobile object 44 and an output from the two condensers 151a and 151b. Accordingly, an offset portion of a result upon extraction shown in FIGS. 5D and 5E disappears, and furthermore, it is possible to improve the resolving power.

Second Embodiment

Figure 7A:
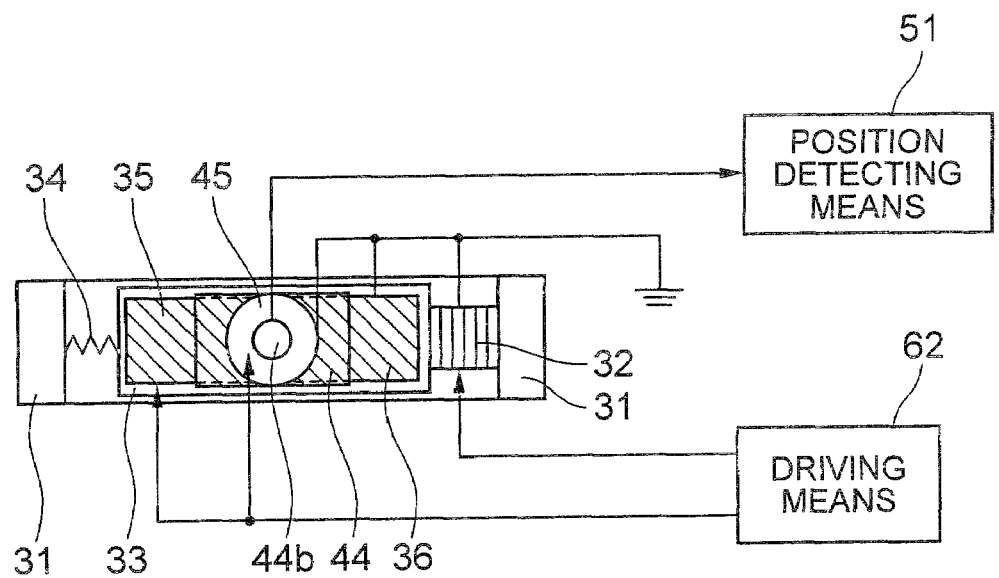
FIG. 7A is a schematic diagram showing a structure of an inertial drive actuator according to a second embodiment of the present invention.
Figure 7B:
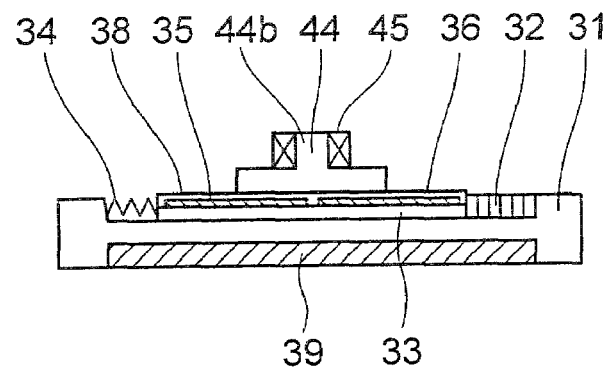
FIG. 7B is a side view showing the structure of the inertial drive actuator.

Next, an inertial drive actuator 60 according to a second embodiment of the present invention will be described below while referring to FIG. 7A, FIG. 7B, and FIG. 8A to FIG. 8E. FIG. 7A is a schematic diagram showing a structure of the inertial drive actuator 60 according to the second embodiment, and shows a plan view of components other than the position detecting means 51 and a driving means 62. FIG. 7B is a side view showing the structure of the inertial drive actuator 60. In FIG. 7B, the position detecting means 51 and the driving means 62 are omitted. FIG. 8A to FIG. 8E are graphs in which, driving detection waveforms in the inertial drive actuator 60 according to the second embodiment are shown, and show waveforms when the mobile object 44 moves to right. FIG. 8A shows a waveform applied to the piezoelectric actuator 32, FIG. 8B shows a waveform applied to the coil 45, FIG. 8C shows a waveform applied to the electrode 35, FIG. 8D shows a waveform output from the mobile object 44, and FIG. 8E shows a waveform output from the position detecting means 51. Same reference numerals are assigned to members which are similar as in the inertial drive actuator 30 according to the first embodiment.

In the inertial drive actuator 60 according to the second embodiment, a wire to the electrode 35 and a wire to the coil 45 of the mobile object 44 are connected as identical wire, to the driving means 62. Moreover, a wire to the electrode 36, a wire at a GND side of the coil 45, and a wire at a GND side of the piezoelectric element 32 are connected to the GND as identical wire. Moreover, in the inertial drive actuator 60, an operation of position detection is carried out after moving the mobile object 44 by applying an output signal for driving. By making such an arrangement, since it is possible to make one at least the wires of the electrode 35 and the coil 45, it is possible to reduce the number of wires and to make the size further smaller.

Rest of the structure, operation, and effect are similar as in the first embodiment.

Third Embodiment

Figure 9:
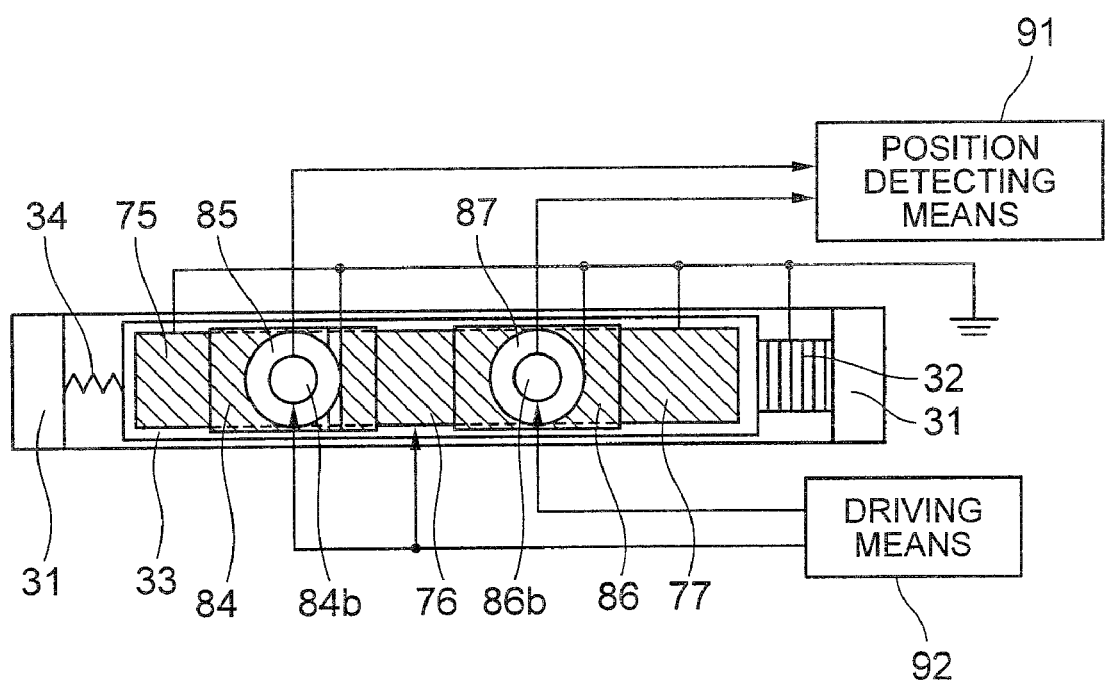
FIG. 9 is a schematic diagram showing a structure of an inertial drive actuator according to a third embodiment.
Figure 10:
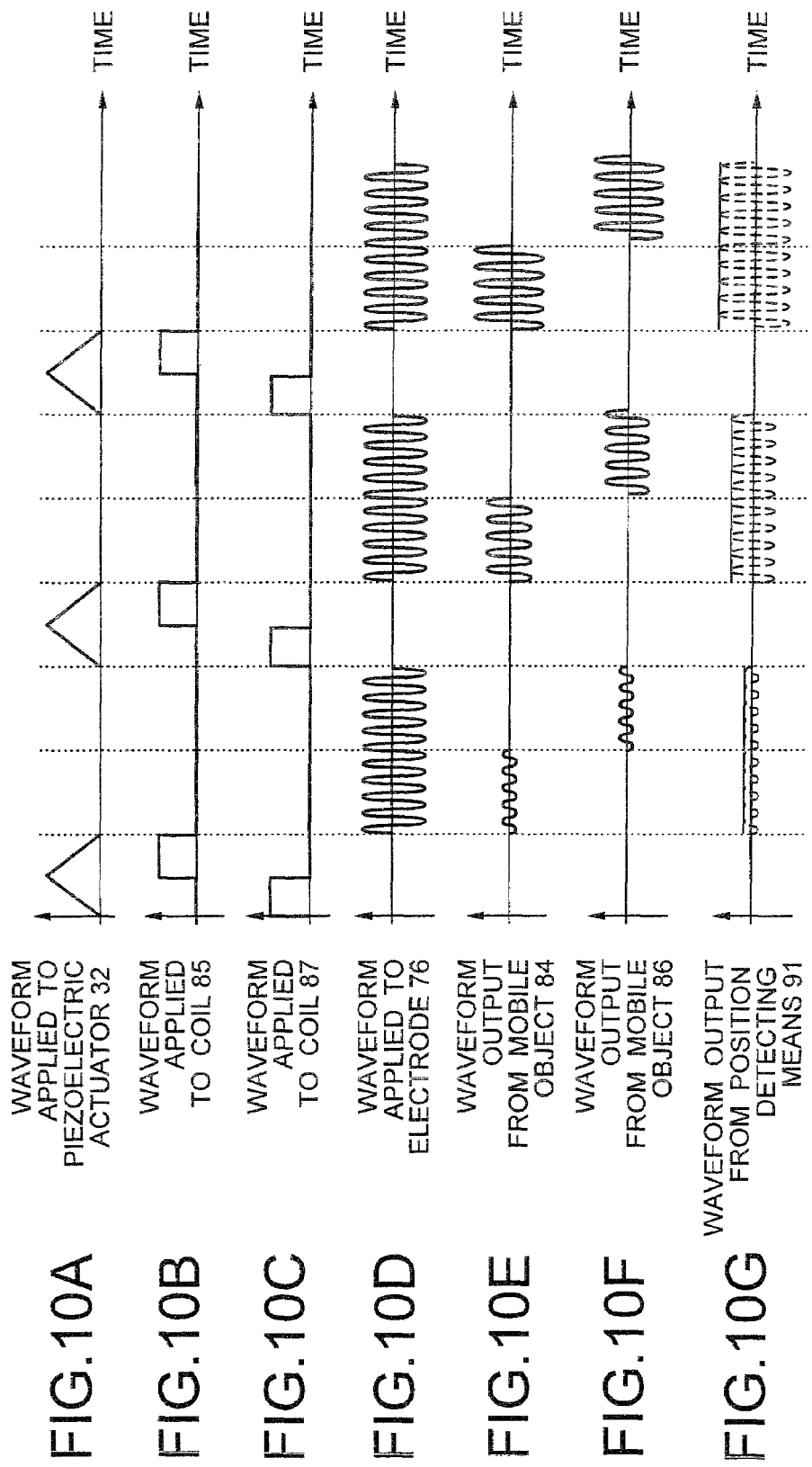
FIG. 10A, FIG. 10B, FIG. 10C, FIG. 10D, FIG. 10E, FIG. 10F, and FIG. 10G (hereinafter, 'FIG. 10A to FIG. 10G') are graphs in which, driving detection waveforms in the inertial drive actuator according to the third embodiment are shown.

Next, an inertial drive actuator 70 according to a third embodiment of the present invention will be described below by referring to FIG. 9, and FIG. 10A to FIG. 10G. FIG. 9 is a schematic diagram showing a structure of the inertial drive actuator 70 according to the third embodiment, and shows a plan view of components other than a position detecting means 91 and a driving means 92. FIG. 10A to FIG. 10G are graphs in which, driving detection waveforms in the inertial drive actuator 70 according to the third embodiment are shown, and show waveforms when a mobile object 84 is moved to right and a mobile object 86 is moved to left. FIG. 10A shows a waveform applied to the piezoelectric element 32, FIG. 10B shows a waveform applied to a coil 85, FIG. 10C shows a waveform applied to a coil 87, FIG. 10D shows a waveform applied to an electrode 76, FIG. 10E shows a waveform output from the mobile object 84, FIG. 10F shows a waveform output from the mobile object 86, and FIG. 10G shows a waveform output from the position detecting means 91. Same reference numerals are assigned to members which are similar as in the inertial drive actuator 30 according to the first embodiment.

In the inertial drive actuator 70 according to the third embodiment, two mobile objects 84 and 86 are disposed in order in a direction of movement (longitudinal direction of the fixed member 31), and three electrode 75, 76, and 77 (detecting electrodes) divided in the direction of movement of the mobile object 84 and 86 are disposed in order, and the inertial drive actuator 70 detects a position of each mobile object. Moreover, similarly as the mobile object 24 in the first embodiment, an adsorption section (not shown in the diagram) is formed on a lower surface of the mobile objects 84 and 86, and protrusions 84b and 86b are formed on an upper surface of the mobile objects 84 and 86 respectively. Furthermore, coils 85 and 87 are disposed around an outer peripheral surface of the protrusions 84b and 86b respectively.

The electrode 76 at a center out of the three electrodes 75, 76, and 77 which are formed by dividing, is connected to a same wire with the coil 85 formed in the mobile object 84, and is connected to the driving means 92. The wire of the electrode 76 may be connected to the coil 87. Moreover, the electrode 75 and the electrode 77 on two sides respectively of the electrode 76 are connected to the GND. In this manner, since the electrode 75 and the electrode 77 are connected to the GND, when wired on the substrate, it is possible to reduce further the number of wires. Moreover, a portion of the protrusion 84b around which the coil 85 is not disposed, and a portion of the protrusion 86b around which the coil 87 is not disposed are connected to the position detecting means 91. In such structure, the electrostatic capacitance is generated (1) between the mobile object 84, and the electrode 75 and the electrode 76, and (2) between the mobile object 86, and the electrode 76 and the electrode 77, and by detecting the electrostatic capacitance generated, it is possible to detect the position of the mobile objects 84 and 86.

FIG. 10A to FIG. 10G are driving detection waveforms for detecting the position of the mobile objects 84 and 86, and show an example of a case in which the mobile object 84 is moved to right and the mobile object 86 is moved to left. Here, regarding the FIG. 10A and FIG. 10B, the waveforms applied being similar to the waveform applied to piezoelectric element 12 and the waveform applied to the coil 25 in FIG. 2A, regarding FIG. 10C also, the waveform applied being similar to the waveform applied to the coil 25 in FIG. 2B, the description in detail is omitted.

When the mobile object 84 moves to right, since the electrostatic capacitance between the electrode 76 and the mobile object 84 becomes large, an output signal becomes smaller gradually as shown in FIG. 10E. On the other hand, when the mobile object 86 moves to left, since the electrostatic capacitance between the electrode 76 and the mobile object 86 becomes larger gradually, an output signal become larger gradually as shown in FIG. 10F. These output signals are input to the position detecting means 91, and an amplitude component which is extracted is detected as a position of the mobile object (FIG. 10G).

As it has been described above, in the third embodiment, since it is possible not only to move two mobile objects 84 and 86 by one piezoelectric element 32, but also to detect the position of each mobile object, it is possible to make small the size of the actuator.

Rest of the structure, operation, and effect are similar as in the first embodiment.

Fourth Embodiment

Figure 11:
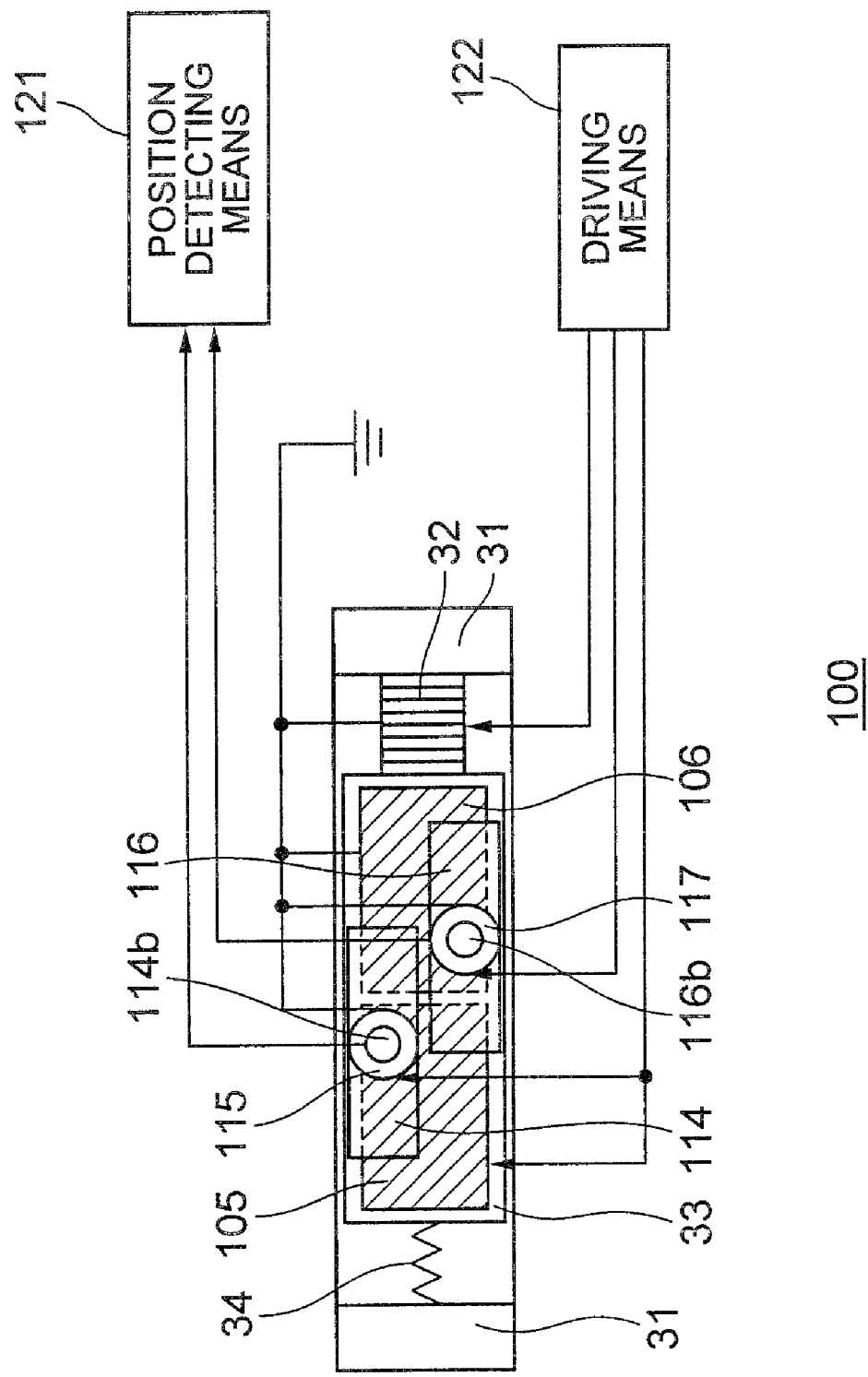
FIG. 11 is a schematic diagram showing a structure of an inertial drive actuator according to a fourth embodiment.
Figure 13A:
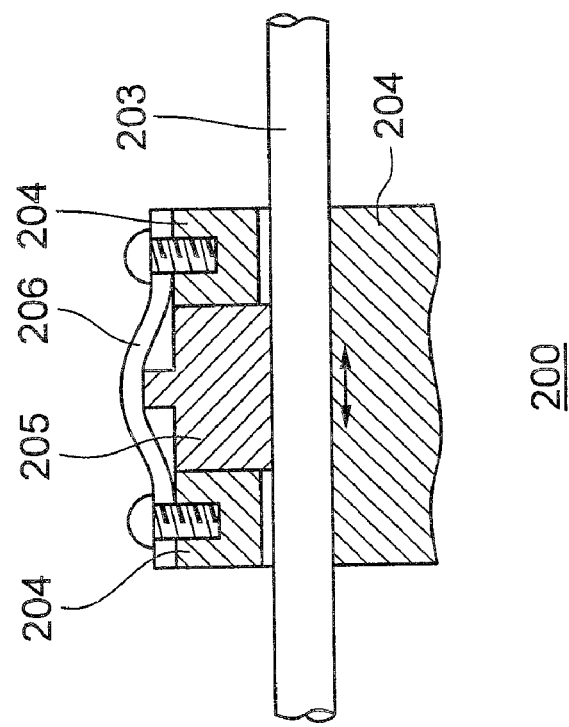
FIG. 13A is a perspective view showing a structure of a conventional inertial drive actuator.
Figure 13B:
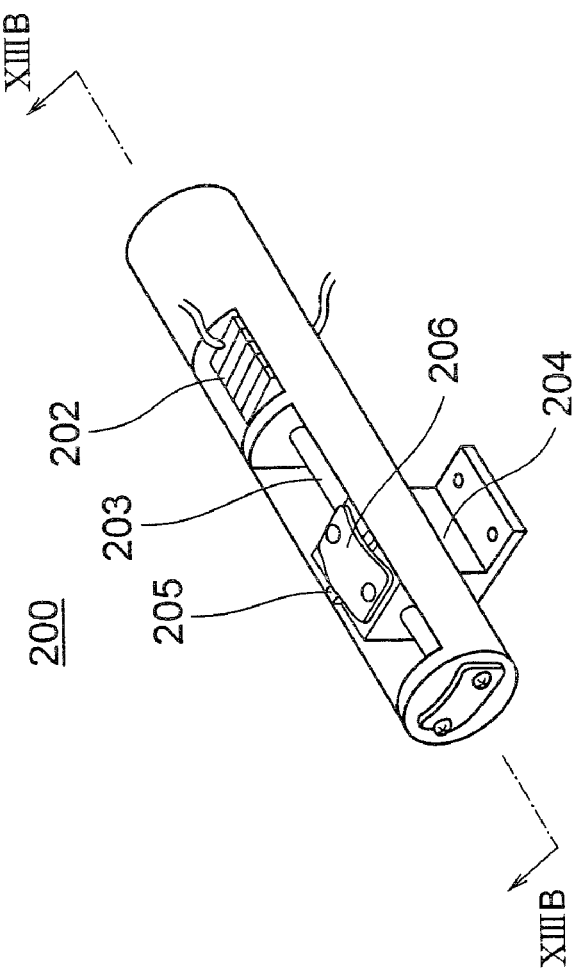
FIG. 13B is a cross-sectional view taken along a line XIIIB-XIIIB in FIG. 13A.
Figure 14:
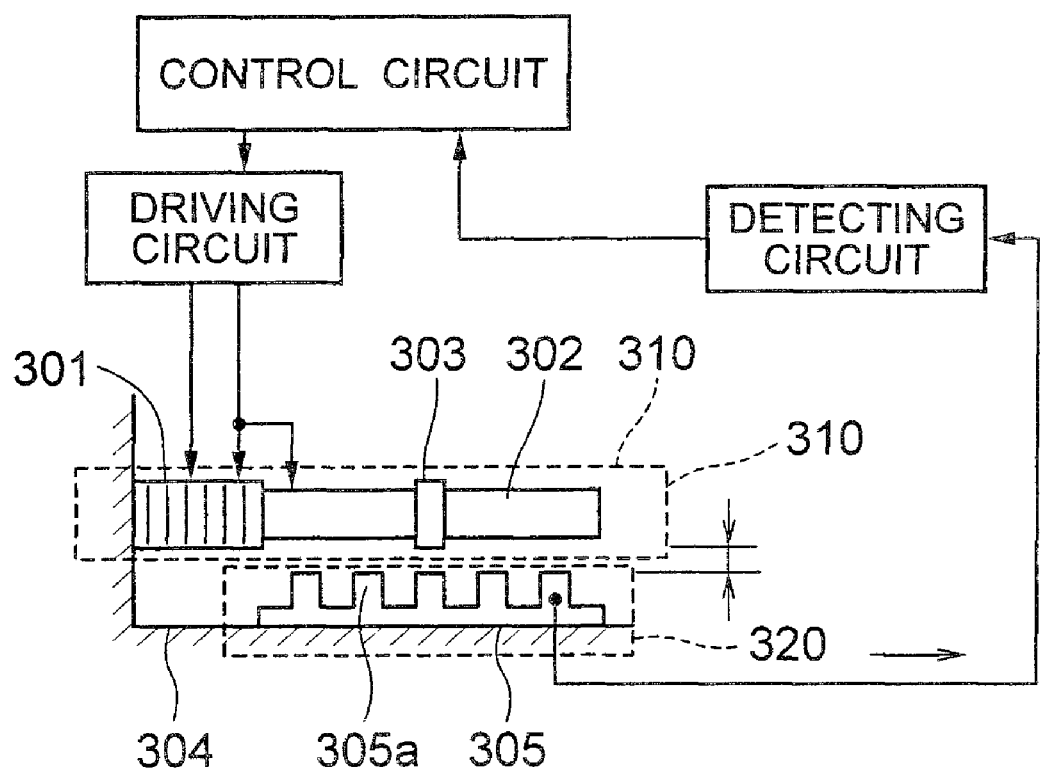
FIG. 14 is a schematic diagram showing a structure of a conventional actuator.

Next, an inertial drive actuator 100 according to a fourth embodiment of the present invention will be described below while referring to FIG. 11, FIG. 12A, and FIG. 12B. FIG. 11 is a schematic diagram showing a structure of the inertial drive actuator 100 according to the fourth embodiment, and shows in a plan view the components other than a position detecting means 121 and a driving means 122. FIG. 12A and FIG. 12B are graphs showing a driving waveform of the inertial drive actuator 100, where, the graph at an upper stage shows a waveform applied to the piezoelectric element 32, a graph at a middle stage shows a waveform applied to a coil 115, and a graph at a lower stage shows a waveform applied to a coil 117. Moreover, FIG. 12A shows waveforms when a mobile object 114 is moved to right and a mobile object 116 is moved to left, and FIG. 12B shows waveforms when the mobile object 114 is moved to left and the mobile object 116 is moved to right. Same reference numerals are assigned to members which are similar as in the inertial drive actuator 30 according to the first embodiment.

In the inertial drive actuator 100 according to the fourth embodiment, the two mobile objects 114 and 116 are disposed in line in a direction perpendicular to the direction of movement (a direction of width of the fixed member 31). On the other hand, two electrodes 105 and 106 (detecting electrodes) are disposed in line in the direction of movement of the mobile objects 114 and 116. Moreover, similar to the mobile object 24 in the first embodiment, an adsorption section (not shown in the diagram) is formed on a lower surface of the mobile objects 114 and 116, and protrusions 114b and 116b are provided on an upper surface of the mobile objects 114 and 116 respectively. The coils 115 and 117 are disposed around an outer peripheral surface of the protrusions 114b and 116b respectively. Moreover, a driving means 122 is connected to the electrode 105, the coils 115 and 117, and the piezoelectric element 32. The coils 115 and 117, the electrode 106, and the piezoelectric element 32 are connected to the GND. Furthermore, a portion of the protrusion 114b around which the coil 115 is not disposed, and a portion of the protrusion 116b around which the coil 117 is not disposed are connected to a position detecting means 121.

According to such arrangement, the vibration substrate 33 is not required to be made long in the direction of movement of the mobile object, and further, the electrode 105 and the electrode 106 can detect the electrostatic capacitance between the two mobile objects 114 and 116. Therefore, it is possible to make the size of the actuator even smaller.

Rest of the structure, operation, and effect are similar as in the first embodiment.

As it has been described above, the inertial drive actuator according to the present invention is capable of displacing minutely a mobile object, and is useful in a small-size equipment in which a position of a mobile object is sought to be detected with high accuracy.

The inertial drive actuator according to the present invention shows an effect that it is possible to provide an inertial drive actuator which is capable of carrying out an accurate position detection over an entire range of movement of a mobile object.

What is claimed is:

1. An inertial drive actuator comprising:
   a fixed member;
   a displacement generating mechanism which is connected to the fixed member, and which generates a displacement in a first direction, and a second direction which is opposite to the first direction;
   a vibration substrate which reciprocates by the displacement generated by the displacement generating mechanism;
   a mobile object which is disposed on the vibration substrate, and which is movable by inertia;
   a driving mechanism which is connected to the mobile object, and which controls a frictional force between the mobile object and the vibration substrate by making an electromagnetic force to act in the mobile object by applying a current;
   a detecting electrode having a position detection function, which is disposed on a flat surface of the vibration substrate, to be facing the mobile object via an insulating body layer, and which is formed such that, an area face-to-face thereof with the mobile object either increases continuously or decreases continuously with the movement of the mobile object; and
   a position detecting mechanism which detects a position of the mobile object by detecting an electrostatic capacitance generated between the mobile object and the detecting electrode.

2. The inertial drive actuator according to claim 1, wherein the detecting electrode is divided into two electrodes with respect to a direction of movement of the mobile object, and
   the mobile object is disposed to be spread over the detecting electrode which is divided into the two electrodes.

3. The inertial drive actuator according to claim 2, wherein the mobile object includes a coil which generates an electromagnetic force by a current applied by the driving mechanism, and
   a wire of one of the two electrodes formed by dividing the detecting electrode is connected to the driving mechanism by a wire same as a signal wire of the coil, and the other electrode is connected to a GND by a wire same as a GND wire of the coil, and
   a timing at which the position detecting mechanism detects the electrostatic capacitance generated between the mobile object and the detecting electrode is after the mobile object has been moved by the driving mechanism.

4. The inertial drive actuator according to claim 3, wherein there exists a plurality of mobile objects which include a coil, in a direction perpendicular to the direction of movement, and
   the driving mechanism changes a magnetic adsorption force between the vibration substrate and the mobile object independently by applying a current independently to the plurality of coils.

5. The inertial drive actuator according to claim 3, wherein the detecting electrode is divided into three electrodes with respect to the direction of movement of the mobile object, and
   there exists a plurality of mobile objects which include a coil, in the direction of movement, and
   the driving mechanism changes a magnetic adsorption force between the vibration substrate and the mobile object independently by applying a current independently to the plurality of coils.

6. The inertial drive actuator according to claim 5, wherein a wire of two electrodes which are not adjacent, out of the three electrodes formed by dividing the detecting electrode in the direction of movement is a common wire.

* * * * *